United States Patent Office 3,703,523
Patented Nov. 21, 1972

3,703,523
TROPANOL ESTERS OF ALPHA-PHENYL-ALPHA-CYCLOPENTYL-ACETIC ACID
Gerhard Walther, Ingelheim am Rhein, Rudolf Bauer, Wiesbaden, and Werner Schulz and Walther Sirrenberg, Ingelheim am Rhein, Germany, assignors to Boehringer Ingelheim G.m.b.H., Ingelheim am Rhein, Germany
No Drawing. Filed May 26, 1971, Ser. No. 147,206
Claims priority, application Germany, June 1, 1970,
P 20 26 661.9
Int. Cl. C07d 43/06
U.S. Cl. 260—292
6 Claims

ABSTRACT OF THE DISCLOSURE

A racemate of a compound of the formula

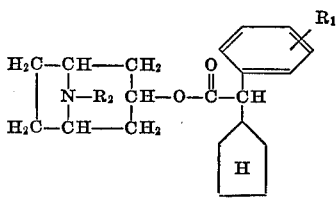

wherein $R_1$ is hydrogen, alkyl of 1 to 4 carbon atoms, alkoxy of 1 to 4 carbon atoms or halogen, and
$R_2$ is hydrogen, alkyl of 2 to 5 carbon atoms, cycloalkyl of 3 to 6 carbon atoms or, when $R_1$ is other than hydrogen, also methyl, optically active components of said racemates, quaternary ammonium salts of said racemates or optically active components, and non-toxic acid addition salts of said racemates or optically active components; the compounds and their salts are useful as anticholinergics.

This invention relates to novel tropanol esters of α-phenyl-α-cyclopentyl-acetic acid and salts thereof, as well as to various methods of preparing these compounds.

More particularly, the present invention relates to a novel class of tropanol esters selected from the group consisting of a racemate of a compound of the formula

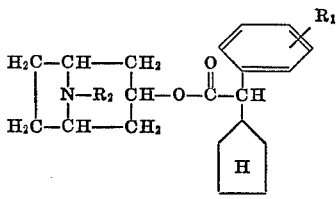

wherein $R_1$ is hydrogen, alkyl of 1 to 4 carbon atoms, alkoxy of 1 to 4 carbon atoms or halogen, and
$R_2$ is hydrogen, alkyl of 2 to 5 carbon atoms, cycloalkyl of 2 to 5 carbon atoms or, when $R_1$ is other than hydrogen, also methyl, optically active components of said racemate, quaternary ammonium salts of said racemate or optically active components, and non-toxic, pharmacologically acceptable acid addition salts of said racemate or optically active components.

The compounds embraced by Formula I may be prepared by various methods involving known chemical reaction principles, among which the following have proved to be particularly convenient and efficient:

METHOD A

By subjecting an N-substituted nortropine of the formula

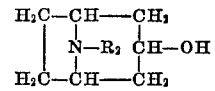

wherein $R_2$ has the same meanings as in Formula I except hydrogen, to an esterification reaction with a derivative of α-phenyl-α-cyclopentyl-acetic acid of the formula

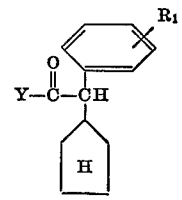

wherein $R_1$ has the same meanings as in Formula I and Y is halogen, lower alkoxy or another substituent which will undergo an esterification reaction with an alcohol. The esterification reaction is preferably performed in an inert organic solvent medium, such as xylene, toluene or heptane, between room temperature and the boiling point of the reaction mixture, and in the presence of an organic base which may optionally be an excess of the basic starting compound, or—if Y in Formula III is a less reactive substituent, such as lower alkoxy—in the presence of a strong basic catalyst, such as an alkali metal alcoholate.

Particularly good yields are obtained when Y in Formula III is halogen, especially chlorine, and the esterification reaction is carried out in anhydrous pyridine as the solvent medium.

This esterification reaction yields a compound of the Formula I wherein $R_2$ is other than hydrogen which may, if desired, be de-alkylated with phosgene in conventional manner to obtain the corresponding nor-tropanol ester.

METHOD B

By alkylating a nor-tropine ester of the formula

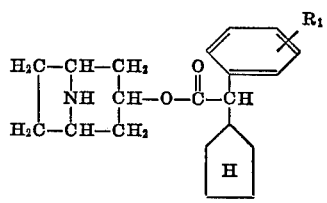

wherein $R_1$ has the same meanings as in Formula I, with an alkylating agent of the formula

$$R_2\text{—}X \qquad (V)$$

wherein $R_2$ has the same meanings as in Formula I and X is halogen, sulfate or sulfonate. The alkylation reaction is carried out in an inert organic solvent medium, such as acetone, a lower alkanol, acetonitrile, benzene, toluene or the like, at a temperature between room temperature and the boiling point of the reaction mixture, and advantageously in the presence of an anhydrous acid acceptor, such as sodium carbonate or calcium carbonate.

However, the alkylation may, for example, also be effected with a mixture consisting of an aldehyde and formic acid, or by means of any other conventional N-alkylation procedure.

Depending upon whether the starting compounds of the Formulas II and IV are racemic mixtures or optically active, methods A and B yield the corresponding racemic or optically active end products.

The compounds of the Formula I are organic bases and therefore form acid addition salts with inorganic or organic acids. Examples of non-toxic, pharmacologically acceptable acid addition salts are those formed with hydrochloric acid, sulfuric acid, phosphoric acid, hydrobromic acid, acetic acid, propionic acid, tartaric acid, citric acid, 8-chlorotheophylline or the like. These salts are prepared in conventional manner, that is, by dissolving the free base in a suitable solvent and acidifying the solution with the desired acid.

Likewise, tertiary amines of the Formula I, i.e. those wherein $R_2$ is other than hydrogen, form quaternary ammonium salts with conventional alkylating agents, especially with an alkyl halide of 1 to 3 carbon atoms.

The starting compounds required for methods A and B are known compounds or may be prepared by known processes.

The tropanols of the Formula II are described in the literature [see Nador et al., Arzneumittelforschung 12, 305 (1962)] or may be prepared in a manner analogous to that described therein.

The α-phenyl-α-cyclopentyl-acetic acid derivatives of the Formula III may be prepared, starting from the corresponding phenyl-acetonitrile, by alkylation with bromocyclopentane and subsequent hydrolysis of the cyano group. This method is described, for example, in British Patent No. 1,032,646.

The starting compounds of the Formula IV may be obtained by de-alkylation of the corresponding N-alkyl-nortropine esters, for instance through the N-chlorocarbonyl compounds, by means of phosgene.

The following examples further illustrate the present invention and will enable others skilled in the art to understand it more completely. It should be understood, however, that the invention is not limited solely to the particular examples given below.

Example 1.—N-isopropyl-nortropine ester of α-phenyl-α-cyclopentylacetic acid and its hydrochloride by Method A 84.6 gm. (0.5 mol) of N-isopropyl-nortropine and 131 gm. (0.6 mol) of methyl α-phenyl-α-cyclopentyl-acetate (B.P. 156–159° C. at 17 mm. Hg; $n_D^{20}=1.5129$) were dissolved in 500 ml. of n-heptane at 60° C., 15 ml. of a 10% sodium methylate solution were slowly added, and the mixture was refluxed for five hours while continuously separating the methanol formed by the reaction with the aid of a water separator. Thereafter, the reaction mixture was cooled, admixed with 500 ml. of ether and extracted first with water and then with 2 N hydrochloric acid. The acid aqueous phase was made alkaline with concentrated ammonia and was then extracted twice with 300 ml. of methylene chloride each. The methylene chloride extracts were combined, washed with water, dried with sodium sulfate and evaporated in vacuo, leaving as the residue 173 gm. (93.6% of theory) of a colorless oil which was identified to be the compound of the formula

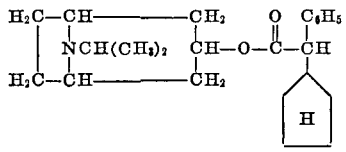

The base was dissolved in dry ether, the solution was acidified with ethereal hydrogen chloride, and the precipitate formed thereby was collected and recrystallized from acetone/ether, yielding the analytically pure hydrochloride, M.P. 199–201° C.

Example 2.—Methobromide of N-isopropyl-nortropine ester of α-phenyl-α-cyclopentyl acetic acid 35.55 gm. (0.1 mol) of the N-isopropyl-nortropine ester of α-phenyl-α-cyclopentyl-acetic acid (see Example 1) were admixed with 200 ml. of acetone and 20 gm. (0.21 mol) of methyl bromide, and the mixture was stirred for 20 hours at room temperature. Thereafter, the precipitate which had formed was collected by vacuum filtration and recrystallized from ethanol/petroleum ether, yielding 36 gm. (80% of theory) of the quaternary compound, M.P. 252–254° C. (decomp.) of the formula

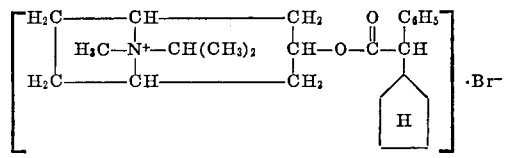

Example 3.—N-ethyl-nortropine ester of α-phenyl-α-cyclophenyl-acetic acid and its hydrochloride by Method A A mixture consisting of 15.52 gm. (0.1 mol) of N-ethyl-nortropine, 23.4 gm. (0.104 mol) of α-phenyl-α-cyclopentyl-acetic acid chloride and 150 ml. of pyridine was refluxed for six hours. Thereafter, the solvent was distilled off in vacuo, the residue was taken up in 2 N hydrochloric acid, the resulting solution was extracted with ether, and the ether extract solution was discarded. The acid aqueous phase was made alkaline with concentrated ammonia, then extracted with ether, the ether extract solution was dried with anhydrous sodium sulfate and evaporated in vacuo, and the oily residue was fractionally distilled in a high vacuum. The fraction passing over between 162–165° C. at 0.05 mm. Hg was the N-ethyl-nortropine ester of α-phenyl-α-cyclopentyl-acetic acid. The yield was 28.2 gm. (82.6% of theory).

The base was converted into the analytically pure hydrochloride, M.P. 198–200° C., by dissolution in dry ether, acidification of the ethereal solution, and recrystallization of the precipitate from acetone/ether.

Example 4.—Methobromide of the N-ethyl-nortropine ester of α-phenyl-α-cyclopentyl-acetic acid 14.8 gm. (0.043 mol) of the N-ethyl-nortropine ester of α-phenyl-α-cyclopentyl-acetic acid were admixed with 40 ml. of acetonitrile and 8.25 gm. (0.087 mol) of methyl bromide, and the mixture was stirred for two hours at room temperature. Thereafter, the crystalline precipitate which had formed was collected by vacuum filtration and recrystallized several times from acetonitrile, yielding 7 gm. (37% of theory) of the white crystalline quaternary salt having a melting point of 256–257° C. (decomp.).

Example 5.—N-ethyl-norpseudotropine ester of α-phenyl-α-cyclopentylacetic acid and its hydrochloride by Method A A mixture consisting of 15.52 gm. (0.1 mol) of N-ethyl-norpseudotropine, 22.3 gm. (0.1 mol) of α-phenyl-α-cyclopentyl-acetic acid chloride and 150 ml. of absolute pyridine was refluxed for six hours. Thereafter, the pyridine was distilled off, the residue was taken up in 2 N hydrochloric acid, and the resulting solution was extracted with chloroform. The chloroform extract solution was washed with water, dried over anhydrous sodium sulfate and evaporated in vacuo. The residue was dissolved in water, the resulting solution was extracted twice with 100 ml. of ether each, and the ethereal extracts were discarded. The acid aqueous phase was made alkaline with concentrated ammonia and then extracted with ether, and the extract solution was dried with magnesium sulfate and evaporated in vacuo, leaving as a residue 28.4 gm. (83.1% of theory) of the N-ethyl-norpseudotropine ester of α-phenyl-α-cyclopentyl-acetic acid, which was converted into the hydrochloride, M.P. 225–227° C. (recrystallized from acetone), with hydrogen chloride in ethereal solution.

Example 6.—N-isopropyl-nortropine ester of α-(p-chlorophenyl)-α-cyclopentyl-acetic acid and its hydrochloride by Method A Using a procedure analogous to that described in Example 5, 12.7 gm. (0.075 mol) of N-isopropyl-nortropine were reacted with 20.3 gm. (0.079 mol) of α-(p-chloro-phenyl)-α-cyclopentyl-acetic acid chloride, and raw oily ester remaining after evaporation of the ethereal extract solution was fractionally distilled in a high vacuum. 21.2 gm. (72.4% of theory) of the compound, B.P. 183–185° C. at 0.01 mm. Hg, of the formula

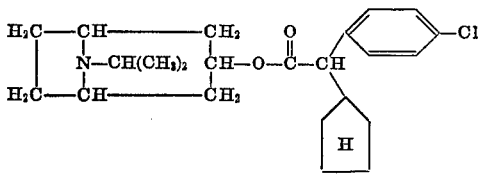

were obtained. Its hydrochloride had a melting point of 192–194° C. (recrystallized from ethanol-ether).

Example 7

The free base obtained in the preceding example was admixed with a stoichiometric excess of methyl bromide and acetonitrile, and the mixture was allowed to stand at room temperature for five hours. Thereafter, the reaction mixture was worked up as described in Example 2, yielding the methobromide of N-isopropyl-nortropine α-(p-chlorophenyl)-α-cyclopentyl-acetate, M.P. 258.5–261.5° C. (recrystallized from acetonitrile).

Example 8.—N-cyclopropyl-nortropine α-phenyl-α-cyclopentyl-acetate and its hydrochloride by Method A 6.1 gm. (0.036 mol) of N-cyclopropyl-nortropine and 8.73 gm. (0.04 mol) of methyl α-phenyl-α-cyclopentyl-acetate were dissolved in 100 ml. of absolute n-heptane at 70° C., and then, while keeping the solution at 70° C., 5 ml. of a 30% sodium methylate solution were slowly added dropwise thereto, and the resulting mixture was refluxed for five hours while simultaneously and continuously separating the methanol released by the reaction with the aid of a water separator. Thereafter, the reaction solution was diluted with 200 ml. of chloroform and then extracted twice with 50 ml. of 0.1 N hydrochloric acid each, whereby the excess unreacted N-cyclopropyl-nortropine in the reaction mixture went into solution in the aqueous phase. The organic phase was extracted twice with 100 ml. of 5 N hydrochloric acid each, the combined extract solutions were made alkaline with aqueous 30% sodium hydroxide while exteriorly cooling with ice, and the base liberated thereby was extracted with three 50 ml.-portions of chloroform. The combined chloroform extracts were washed with water, dried with anhydrous sodium sulfate and evaporated in vacuo, leaving as a residue 9 gm. (70.6% of theory) of the compound of the formula

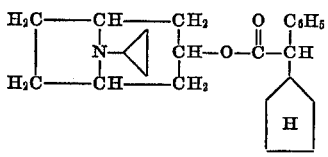

Its hydrochloride had a melting point of 178–180° C. (recrystallized from methyl isobutyl ketone).

Example 9.—Methobromide of N-cyclopropyl-nortropine α-phenyl-α-cyclopentyl-acetate 4.5 gm. (0.013 mol) of N-cyclopropyl-nortropine α-phenyl-α-cyclopentyl-acetate were dissolved in 30 ml. of acetone, 50 ml. of an acetonic 20% methyl bromide solution (0.1 mol) were added, and the mixture was allowed to stand in a closed container at room temperature for four days and then for four more days at 50° C. Thereafter, the precipitate formed during that time was collected and recrystallized from isopropanol, yielding 5 gm. (87.6% of theory) of the methobromide of N-cyclopropyl-nortropine α-phenyl-α-cyclopentyl-acetate, M.P. 239–241° C.

Example 10.—Tropine and nortropine α-(o-tolyl)-α-cyclopentyl-acetates and their hydrochlorides by Method A (a) 47.35 gm. (0.2 mol) of α-(o-tolyl)-α-cyclopentyl-acetic acid chloride [B.P. 160–162° C. at 14 mm. Hg; α-(o-tolyl)-α-cyclopentyl-acetic acid : B.P. 140–142° C. at 0.01 mm. Hg] were added dropwise to a boiling solution of 56.5 gm. (0.4 mol) of tropine in 100 ml. of absolute toluene, and the resulting mixture was refluxed for three hours. Thereafter, the reaction mixture was cooled and then extracted with water to remove the tropine hydrochloride which had separated out. The toluene phase was extracted twice with 2 N hydrochloric acid, and the acid aqueous extracts were combined, made alkaline with concentrated ammonia and extracted with ether. The ethereal extract solution was washed with water, dried over anhydrous sodium sulfate and evaporated in vacuo, leaving as a residue 65 gm. (95% of theory) of tropine α-(o-tolyl)-α-cyclopentylacetate of the formula

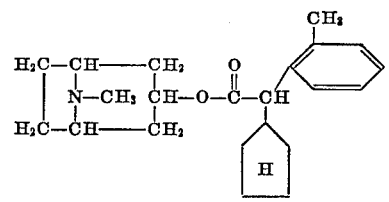

Its hydrochloride, obtained by acidifying an ethereal solution of the base with ethanol hydrochloric acid, had a melting point of 206–208° C. (recrystallized from acetone/ether).

(b) 341.49 gm. (1 mol) of tropine α-(o-tolyl)-α-cyclopentyl-acetate were admixed with 400 ml. of a 30% solution of phosgene in absolute toluene, and the mixture was allowed to stand at room temperature for 24 hours. Thereafter, the reaction solution was evaporated in vacuo, the residue was cooled and stirred with a mixture of 2 N hydrochloric acid and ether, and the ethereal phase was separated, washed with water, dried over sodium sulfate and evaporated in vacuo. The residue, N-chlorocarbonyl-nortropine α-(o-tolyl)-α-cyclopentyl-acetate, was admixed with 400 ml. of water, the aqueous mixture was heated whereby carbon dioxide was released, the hot aqueous solution was filtered through activated charcoal, and the filtrate was evaporated in vacuo. The residue was recrystallized form ethanol/ether, yielding 287 gm. (79% of theory) of nortropine α-(o-tolyl)-α-cyclopentyl-acetate hydrochloride, M.P. 199–201° C., of the formula

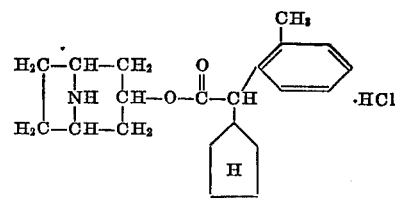

Example 11.—Tropine and nortropine α-phenyl-α-cyclopentyl-acetate and their hydrochlorides by Method A (a) A mixture consisting of 1.4 gm. (0.1 mol) of tropine, 11.7 gm. (0.052 mol) of α-phenyl-α-cyclopentyl-acetic acid chloride and 80 ml. of toluene was refluxed for three hours. Thereafter, the reaction mixture was worked up as described in Example 10(a), yielding tropine α-phenyl-α-cyclopentyl-acetate hydrochloride, M.P. 234–236° C.

(b) 327.8 gm. (1 mol) of tropine α-phenyl-α-cyclopentyl-acetate were admixed with 600 ml. of a 30% solution of phosgene in toluene, and the mixture was allowed to stand at room temperature for 24 hours. Thereafter, the reaction solution was evaporated in vacuo, the residue was stirred with a mixture of 2 N hydrochloric acid and ether, and the organic phase was separated, washed with water, dried over sodium sulfate and evaporated in vacuo. The residue, N-chlorocarbonyl-nortropine α-phenyl-α-cyclopentyl-acetate, was hydrolized as described in Example 10(b) and recrystallized from ethanol/ether, yielding 293 gm. (83.8% of theory) of nortropine α-phenyl-α-cyclopentyl-acetate hydrochloride, M.P. 229–232° C., of the formula

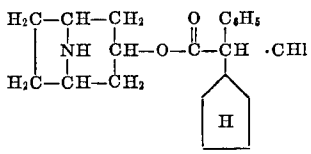

Example 12.—Tropine α-cyclopentyl-phenylacetate ethobromide

A solution of 7.9 gm. (0.024 mol) of tropine α-cyclopentyl-phenylacetate and 6.55 gm. (0.06 mol) of ethyl bromide in 50 ml. of acetonitrile was stirred for 22 hours at room temperature. Thereafter, the crystalline precipitate which had formed was collected and recrystallized from ethanol, yielding 6.6 gm. (62.7% of theory) of the quaternary compound, M.P. 269–271° C. (decomp.), of the formula

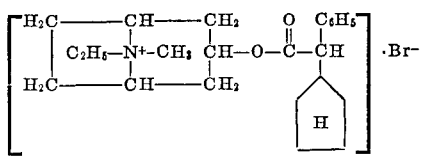

Example 13.—(+)- and (−)-α-cyclopentyl-phenylacetic acid nortropine ester hydrochloride (a) 179 gm. (0.57 mol) of racemic nortropine α-cyclopentyl-phenylacetate and 85.5 gm. (0.57 mol) of L(+)-tartaric acid were dissolved in 1300 ml. of hot methanol, the resulting solution was allowed to cool, and the crystalline precipitate formed thereby was collected and recrystallized from methanol until the product had a constant melting point and specific rotation value. 52.2 gm. of (−)-nortropine α-cyclopentyl-phenylacetate tartrate, M.P. 199–200° C. (decomp.), specific rotation $[\alpha]_D^{27}=-20°$ (c. =5, dimethylsulfoxide), were obtained. The enantiomeric base was liberated from the tartrate with ammonia, and the base was converted in conventional manner into its hydrochloride, yielding (−)-nortropine α-cyclopentyl-phenylacetate hydrochloride, M.P. 225–227° C. (recrystallized from ethanol/ether), specific rotation $[\alpha]_D^{27}=-35°$ (c.=5, ethanol).

(b) By treating the mother liquors from (a) with D(−)-tartaric acid in analogous fashion, 50.7 gm. of the tartrate of the (+)-base, M.P. 198–200° C. (decomp.), specific rotation $[\alpha]_D^{28}=+20°$ (c.=5, dimethylsulfoxide), were obtained, from which the (+)-base was liberated and converted into its hydrochloride, yielding (+)-nortropine α-cyclopentyl-phenylacetate hydrochloride, M.P. 224.5–226.5° C. (recrystallized from ethanol/ether), specific rotation $[\alpha]_D^{28}=+35°$ (c.=5, ethanol).

Example 14

Using a procedure analogous to that described in Example 12, N-ethyl-nortropine α-cyclopentyl-phenylacetate ethobromide, M.P. 254–256° C. (decomp.), was prepared from N - ethyl - nortropine α-cyclopentyl-phenylacetate and ethyl bromide.

Example 15

Using a procedure analogous to that described in Example 1, N - propyl - nortropine α-cyclopentyl - phenylacetate hydrochloride, M.P. 224–228° C., was prepared from N-propyl-nortropine and methyl α - cyclopentyl-phenylacetate.

Example 16

Using a procedure analogous to that described in Example 12, N -isopropyl - nortropine α - cyclopentyl-phenyl - acetate ethobromide, M.P. 250–252° C. (decomp.), was prepared from N - isopropyl - nortropine α-cyclopentyl-phenylacetate and ethyl bromide.

Example 17

Using a procedure analogous to that described in Example 2, N - isopropyl - nortropine α-cyclopentyl-p-tolyl-acetate methobromide, M.P. 248–250° C. (decomp.), was prepared from N - isopropyl-nortropine α-cyclopentyl-p-tolylacetate and methyl bromide.

Example 18

Using a procedure analogous to that described in Example 1, N - isopropyl-nortropine α-cyclopentyl-m-tolyl-acetate hydrochloride, M.P. 205–206° C., was prepared from N-isopropyl-nortropine and methyl α-cyclopentyl-m-tolylacetate.

Example 19

Using a procedure analogous to that described in Example 2, N - isopropyl - nortropine α-cyclopentyl-m-tolyl-acetate methobromide, M.P. 251.5–254° C. (decomp.), was prepared from N - isopropyl-nortropine α-cyclopentyl-m-tolylacetate and methyl bromide.

Example 20

Using a procedure analogous to that described in Example 1, N - isopropyl - nortropine α-cyclopentyl-o-tolyl-acetate hydrochloride, M.P. 201.5–203.5° C., was prepared from N-isopropyl-nortropine and methyl α-cyclopentyl-o-tolylacetate.

Example 21

Using a procedure analogous to that described in Example 2, N-isopropyl-nortropine α-cyclopentyl-o-tolyl-acetate methobromide, M.P. 241–243° C. (decomp.), was prepared from N - isopropyl - nortropine α-cyclopentyl-o-tolylacetate and methyl bromide.

Example 22

Using a procedure analogous to that described in Example 5, N - isopropyl - nortropine α - cyclopentyl-o-chlorophenylacetate hydrochloride, M.P. 210.5–212.5° C., was prepared from N-isopropyl-nortropine and α-cyclopentyl-o-chlorophenyl-acetic acid chloride.

Example 23

Using a procedure analogous to that described in Example 2, N - isopropyl - nortropine α - cyclopentyl-o-chlorophenyl-acetate methobromide, M.P. 251.5–254° C. (decomp.), was prepared from N-isopropyl-nortropine α-cyclopentyl-o-chlorophenyl-acetate and methyl bromide.

Example 24

Using a procedure analogous to that described in Example 5, N - isopropyl - nortropine α - cyclopentyl-m-methoxyphenyl acetate hydrochloride, M.P. 186–188° C., of the formula

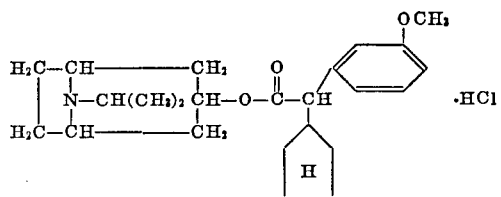

was prepared from N-isopropyl-nortropine and α-cyclopentyl-m-methoxyphenyl-acetic acid chloride.

Example 25

Using a procedure analogous to that described in Example 2, N - isopropyl - nortropine α-cyclopentyl-m- methoxy-phenyl-acetate methobromide, M.P. 217–219° C. (decomp.), was prepared from N-isopropyl-nortropine α-cyclopentyl-m-methoxy - phenyl - acetate and methyl bromide.

Example 26

Using a procedure analogous to that described in Example 13, (—) - N - isopropyl - nortropine α-cyclopentyl-phenylacetate hydrochloride, M.P. 224.5–227.5° C., specific rotation $[\alpha]_D^{28} = -34°$ (c.=5, ethanol), and (+)- N-isopropyl-nortropine α - cyclopentyl - phenylacetate hydrochloride, M.P. 224.5–227° C., specific rotation $[\alpha]_D^{28} = +34°$ (c.=5, ethanol), were isolated from racemic N-isopropyl-nortropine α - cyclopentyl - phenyl-acetate.

Example 27

Using a procedure analogous to that described in Example 2, (+) - N - isopropyl - nortropine α - cyclopentyl-phenyl-acetate methobromide, M.P. 256° C. (decomp.), specific rotation $[\alpha]_D^{27} = +30°$ (c.=5, ethanol), was prepared from (+) - N - isopropyl-nortropine α-cyclopentyl-phenylacetate and methyl bromide.

Example 28

Using a procedure analogous to that described in Example 2, (—) - N - isopropyl - nortropine α - cyclopentyl-phenylacetate methobromide, M.P. 256° C. (decomp.), specific rotation $[\alpha]_D^{27} = -30°$ (c.=5, ethanol), was prepared from (—) - N - isopropyl - nortropine α-cyclopentyl-phenylacetate and methyl bromide.

Example 29

Using a procedure analogous to that described in Example 8, N-cyclohexyl-nortropine α-cyclopentyl-m-tolylacetate hydrochloride, M.P. 264–266° C., of the formula

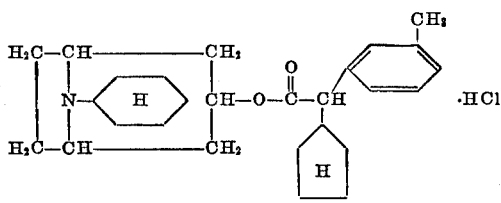

was prepared from N-cyclohexyl-nortropine and methyl α-cyclopentyl-m-tolylacetate.

Example 30

Using a procedure analogous to that described in Example 11(a), tropine α-cyclopentyl-o-tolylacetate hydrochloride, M.P. 206–208° C. (decomp.), was prepared from tropine and α-cyclopentyl-o-tolylacetic acid chloride.

Example 31

Using a procedure analogous to that described in Example 1, N-tert.butyl-nortropine α-cyclopentyl-phenylacetate hydrochloride, M.P. 241–244° C. (decomp.), was prepared from N-tert.butyl-nortropine and methyl α-cyclopentyl-phenylacetate.

Example 32

Using a procedure analogous to that described in Example 3, N-ethyl-nortropine α-cyclopentyl-o-tolylacetate hydrochloride, M.P. 228–230° C., was prepared from N-ethylnortropine and α-cyclopentyl-o-tolylacetic acid chloride.

Example 33

Using a procedure analogous to that described in Example 1, N-isobutyl-nortropine α-cyclopentyl-phenylacetate hydrochloride, M.P. 181–183° C., was prepared from N-isobutyl-nortropine and methyl α-cyclopentyl-acetate.

Example 34

Using a procedure analogous to that described in Example 10(a), pseudotropine α-cyclopentyl-phenylacetate hydrochloride, M.P. 239–241° C., was prepared from pseudotropine and α-cyclopentyl-phenylacetic acid chloride.

Example 35

Using a procedure analogous to that described in Example 2, pseudotropine α-cyclopentyl-phenylacetate methobromide, M.P. 250–252° C. (decomp.), was prepared from pseudotropine α-cyclopentyl-phenylacetate and methyl bromide.

The compounds according to the present invention, that is, the racemic and optically active compounds embraced by Formula I above, their alkylohalide quaternary ammonium salts and their non-toxic, pharmacologically acceptable acid addition salts, have useful pharmacodynamic properties. More particularly, the compounds of the instant invention exhibit very effective anticholinergic activities in warm-blooded animals, such as mice, rats, dogs, with practically no undesirable side-effects, such as mydriasis, tachycardia and inhibition of saliva secretion.

Particularly effective are the tertiary amines of the Formula I wherein $R_2$ is alkyl of 2 to 3 carbon atoms; these compounds exhibit an exceptionally favorable therapeutic ratio of principal anticholinergic activity to undesirable side-effects. Quaternization of these compounds with a lower alkyl group, especially with a methyl group, leads to a further substantial increase of the anticholinergic activity without appreciably intensifying the undesirable side-effects.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like.

One effective anticholinergic doage unit of the compounds of the instant invention is from 0.0005 to 0.167 mgm./kg., preferably 0.0016 to 0.0167 mgm./kg., for parenteral administration, and from 0.0166 to 5.0 mgm./kg., preferably 0.166 to 1.67 mgm./kg., for peroral administration.

The following examples illustrate a few pharmaceutical dosage unit compositions comprising a compound of the present invention as an active ingredient and represent the best modes contemplated of putting the invention into practical use. The parts are parts by weight unless otherwise specified.

Example 36.—Coated pills

The pill core composition is compounded from the following ingredients:

| | Parts |
|---|---|
| N-isopropyl-nortropine α-cyclopentyl-phenylacetate methobromide | 10.0 |
| Lactose | 57.0 |
| Corn starch | 30.0 |
| Gelatin | 2.0 |
| Magnesium stearate | 1.0 |
| Total | 100.0 |

Preparation.—The nortropine ester is intimately admixed with the lactose and the corn starch, the mixture is moistened with an aqueous 10% solution of the gelatin, the moist mass is forced through a 1 mm.-mesh screen, the resulting granulate is dried at 40° C. and again passed through the screen, the dry granulate is admixed with the magnesium stearate, and the resulting composition is compressed into 100 mgm.-pill cores which are subsequently coated in conventional manner with a thin shell consisting essentially of a mixture of sugar, talcum, titanium dioxide and gum arabic, and finally polished with beeswax. Each coated pill contains 10 mgm. of the nortropine ester and is an oral dosage unit composition with very effective anti-cholinergic action.

Example 37.—Tablets

The tablet composition is compounded from the following ingredients:

| | Parts |
|---|---|
| N-ethyl - nortropine α - cyclopentyl - phenylacetate methobromide | 6 |
| Lactose | 100 |
| Corn starch | 64 |
| Soluble starch | 8 |
| Magnesium stearate | 2 |
| Total | 180 |

Preparation.—The nortropine ester is intimately admixed with the magnesium stearate, the mixture is moistened with an aqueous solution of the soluble starch, the moist mass is granulated, the granulate is dried and admixed with the lactose and the corn starch, and the composition is compressed into 180 mgm.-tablets. Each tablet contains 6 mgm. of the nortropine ester and is an oral dosage unit composition with very effective anticholinergic action.

Example 38.—Suppositories

The suppository composition is compounded from the following ingredients:

| | Parts |
|---|---|
| N-isopropyl-nortropine α-cyclopentyl-phenylacetate hydrochloride | 30 |
| Suppository base (cocoa butter) | 1670 |
| Total | 1700 |

Preparation.—The finely pulverized nortropine ester is homogeneously blended with an immersion homogenizer into the suppository base which had previously been melted and cooled to 40° C., and 1700 mgm.-portions of the resulting mixture are poured at 35° C. into cooled suppository molds. Each suppository contains 30 mgm. of the nortropine ester and is a rectal dosage unit composition with very effective anti-chlorinergic action.

Example 39.—Hypodermic solution

The solution is compounded from the following ingredients:

| | Parts |
|---|---|
| N-ethyl-nortropine α-cyclopentyl-phenylacetate hydrochloride | 1.0 |
| Sodium chloride | 18.0 |
| Distilled water, q.s. 2000.0 parts by vol. | |

Preparation.—The nortropine ester and the sodium chloride are dissolved in the distilled water, the solution is filtered until free from suspended particles, the filtrate is filled into 2 cc.-ampules under aseptic conditions, and the filled ampules are sealed and sterilized. Each ampule contains 1 mgm. of the nortropine ester and the solution contained therein is an intravenous dosage unit composition with very effective antichlorinergic action.

Analogous results were obtained when any one of the other compounds of the instant invention was substituted for the particular tropanol ester in Examples 36 through 39. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A racemate of a compound of the formula

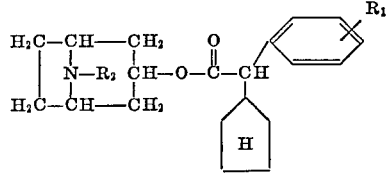

wherein $R_1$ is hydrogen, alkyl of 1 to 4 carbon atoms, alkoxy of 1 to 4 carbon atoms or halogen, and $R_2$ is hydrogen, alkyl of 2 to 5 carbon atoms, cycloalkyl of 3 to 6 carbon atoms or, when $R_1$ is other than hydrogen, also methyl, optically active components of said racemate, lower alkyl quaternary ammonium salts of said racemate or optically active components, or non-toxic, pharmacologically acceptable acid addition salts of said racemate or optically active components.

2. A compound according to claim 1, wherein $R_1$ is hydrogen, methyl, methoxy or chlorine, and $R_2$ is hydrogen, alkyl of 2 to 4 carbon atoms, cyclopropyl, cyclohexyl or, when $R_1$ is other than hydrogen, also methyl.

3. A compound according to claim 1, wherein $R_1$ is hydrogen, methyl, methoxy or chlorine, and $R_2$ is alkyl of 2 to 3 carbon atoms.

4. A compound according to claim 1, which is racemic or optically active N-isopropyl-nortropine α-cyclopentyl-phenylacetate, a lower alkyl quaternary ammonium halide salt thereof, or a non-toxic, pharmacologically acceptable acid addition salt thereof.

5. A compound according to claim 1, which is racemic or optically active N-ethyl-nortropine α-cyclopentyl-phenylacetate, a lower alkyl quaternary ammonium halide salt thereof, or a non-toxic, pharmacologically acceptable acid addition salt thereof.

6. A compound according to claim 1, which is racemic or optically active N-isopropyl-nortropine α-cyclopentyl-o-tolylacetate, a lower alkyl quaternary ammonium halide salt thereof, or a non-toxic, pharmacologically acceptable acid addition salt thereof.

References Cited

Zirkle et al.: Journal of Medicinal and Pharmaceutical Chemistry, vol. 5, pp. 341–356 (1962).

ALAN L. ROTMAN, Primary Examiner

U.S. Cl. X.R.

424—265